United States Patent Office 3,474,755
Patented Oct. 28, 1969

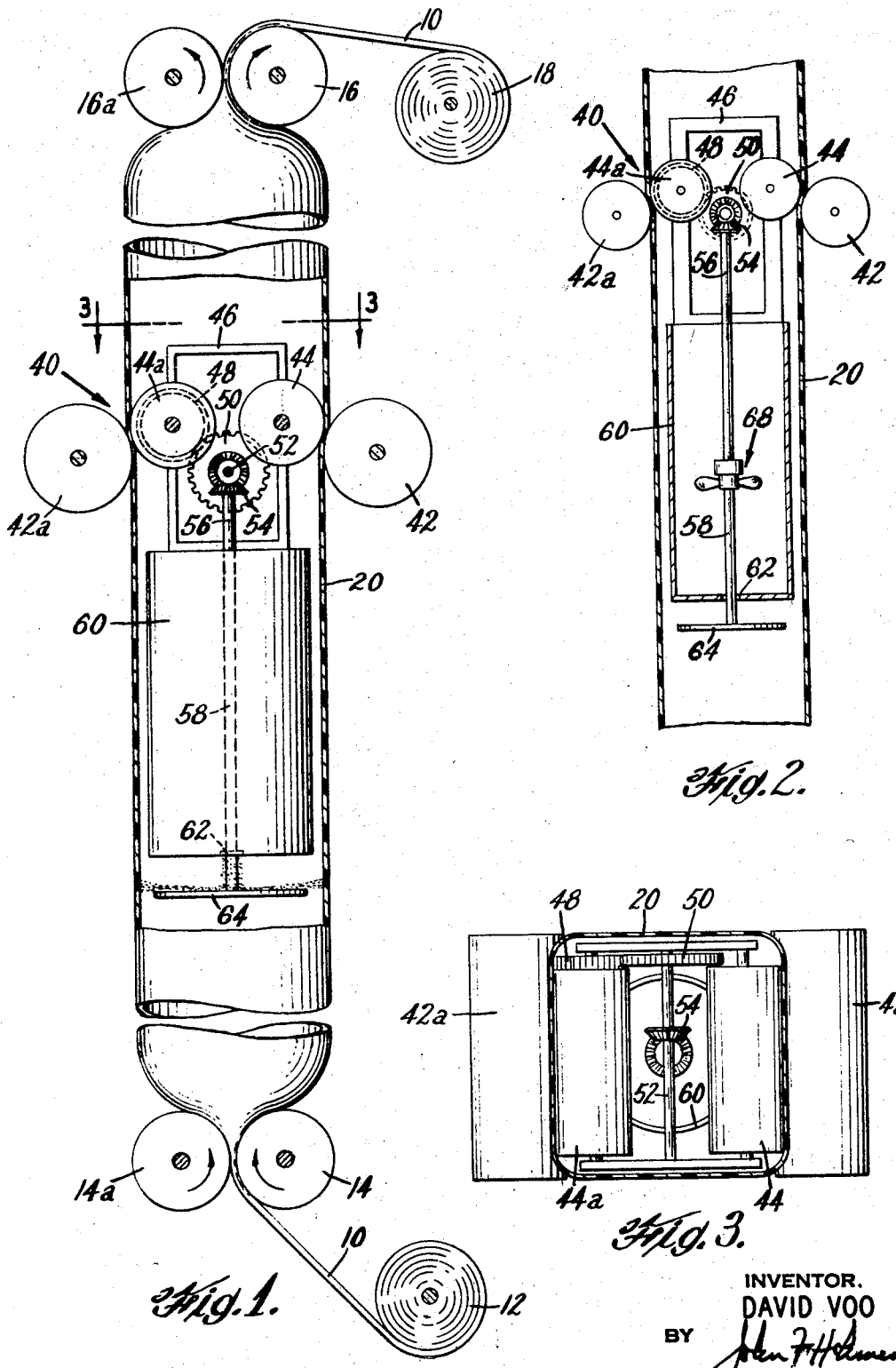

3,474,755
INTERNAL DUSTING APPARATUS
David Voo, Park Forest, Ill., assignor to Union Carbide
Corporation, a corporation of New York
Filed Dec. 10, 1965, Ser. No. 512,974
Int. Cl. B05b 7/24
U.S. Cl. 118—44                                    9 Claims

ABSTRACT OF THE DISCLOSURE

A self-energized internal dusting apparatus is provided within the wall of a tubular film and serves to automatically dust the inside wall of the tubular film with an anti-blocking agent as the tubular film is advanced.

---

The present invention relates to an apparatus for dusting tubular, plastic films. More particularly, the present invention relates to a new and improved apparatus and a method for dusting the inside wall of tubular plastic films so that the blocking characteristics which these films exhibit are significantly reduced and overcome.

As is well known to those skilled in the art, the terms "blocking" and "blocking characteristics" pertain and refer to that phenomenon which adjacent plies of film exhibit as an inability to freely slide or slip over each other or be easily separated from each other. Hence, reference to these terms as employed throughout this application and in the accompanying claims is intended to include and refer to the phenomenon described hereinabove.

Fabricated bags and containers which exhibit blocking characteristics are difficult to open when preparing them for the packaging of articles. This difficulty is encountered when either hand operating methods or automatic means are employed. Heretofore, various methods and techniques have been employed to overcome the blocking characteristics which these tubular films exhibit but they have generally proven to be deficient or produce undesirable side effects. For example, one method involves the use of a porous dust bag which is inserted in the bubble formed in a web of tubular plastic film. The porous dust bag is then shaken to disperse a powder on the wall of the bubble as the tubular film is traversed adjacent thereto. This method is not entirely satisfactory since the dispersion of the powder on the film wall is not uniform, subsequently resulting in blocking.

Another disadvantage common to this system is that too much powder is often deposited on the film wall leading to difficulties when these films are later heat-sealed. The deposition of excess powder on the film wall inhibits the penetration of heat through the film plies thereby preventing one film ply from coalescing to an adjacent film ply.

More recently, equipment, such as "self-powered" dusting apparatus, have been employed to dust the inside wall of tubular films. While more successful than their forerunners, this type of equipment has also not been completely successful and has inherent drawbacks. Although referred to as "self-powered," these apparatus are actually powered from outside sources, such as small motors, batteries and the like, and require at least a minimum of electrical circuitry for their operation. Such apparatus are, therefore, generally bulky in design, costly to run and maintain, require separate regulation to disperse the powdered agents, and, more significantly, present potential explosion hazards should the apparatus produce a spark or develop a short circuit when the powdered dusting agent reaches explosive concentrations.

It is an object of the present invention, therefore, to provide an apparatus for dusting the inside wall of tubular films and to prevent blocking which apparatus is of simple design and construction, is economical to run and maintain, does not deposit powder such that it interferes with subsequent heat-sealing operations of the film, and eliminates potential explosion hazard.

Another object of the present invention is to provide an apparatus for internally dusting tubular films which requires no separate source of energy for its operation and automatically uniformly disperses dusting powder only while the tubular film is moving.

These and further objects of the present invention will become more clear from the ensuing discussion.

It has been found that the objects of the present invention can be accomplished by providing an internal dusting apparatus positioned to function within the wall of a tubular film and which deposits powder on the wall of the tubular film only when the tubular film is being traversed adjacent thereto. Additionally, the internal dusting apparatus of the present invention is energized solely by the traversing movement of the tubular film, thereby eliminating the need to supply outside sources of power.

The internal dusting apparatus of the present invention generally comprises, in combination, support means positioned within a web of tubular plastic film; rotatable means mounted on said support means and cooperating with rotatable means mounted outside the tubular film so that the wall of the tubular film is frictionally engaged by and between said rotatable means; a reservoir suspended from said support means; metering means vertically disposed within said reservoir; and dispersion means positioned beneath said reservoir.

In one embodiment, the internal dusting apparatus of the present invention is provided with an agitating device attached to the vertically disposed metering means intermediate its ends within the reservoir. This agitating device serves to stir, agitate and propel the powder in the reservoir. For example when powdered anti-blocking agents are employed which exhibit poor flow properties or which tend to pack due to unfavorable atmospheric conditions, such as humidity, this device acts to assist the powdered, anti-blocking agent to flow more readily and be carried to the dispersion means.

The powdered, anti-blocking agents which can be employed with the internal dusting apparatus of the present invention are not critical. Generally, commercially available powdered anti-blocking agents similarly utilized by those skilled in the art are acceptable for use herein and include such materials as corn starch, potato starch, mixtures of corn starch and potato starch, and the like. In short, any powdered material which is capable of being dispersed by the apparatus of the present invention and which will prevent adjacent plies of tubular plastic film from adhering to each other can be employed.

When anti-blocking agents exhibit poor flow properties or tend to become packed due to humid atmospheric conditions, small amounts of commercially available additives can be mixed therein, such as powdered silicon dioxide, to enhance their flow properties.

Hence, the term "powdered, anti-blocking agent" as employed throughout this application and in the claims is intended to refer to and include the commercially available powders and powder mixtures described immediately hereinabove.

The invention will become more clear when considered together with the accompanying drawing wherein:

FIGURE 1 is a schematic elevational view of the dusting apparatus of the present invention positioned within the bubble formed in a web of tubular plastic film;

FIGURE 2 is an exaggerated schematic elevational view illustrating in more detail the dusting apparatus of the present invention; and FIGURE 3 is a top sectional view taken through line 3—3 of FIGURE 1 and looking in the direction of the arrows.

Turning now to the drawing, wherein like reference numerals denote like parts, there is shown in FIGURES 1 and 2, a flattened web of tubular plastic film, generally designated by reference numeral 10, being unwound from a feed supply roll 12.

The tubular film is threaded between a first pair of rotatably mounted pinch rollers 14 and 14a, thence between a second pair of rotatably mounted pinch rollers 16 and 16a and is finally collected on a take-up or inventory roll 18.

Between the first pair of pinch rollers 14 and 14a, and the second pair of pinch rollers, 16 and 16a, a bubble 20 is formed in the web of flattened tubular film 10 and the dusting apparatus of the present invention, generally designated by reference numeral 40, is positioned therein.

The manner in which the bubble is formed in the flattened tubular film 10 and the dusting device 40 positioned and firmly seated therein can be accomplished by techniques which are well known to those skilled in the art. For example, the bubble 20 in the flattened tubular film 10 can be readily formed by making an aperture in the tubular film 10 and introducing therein air under low pressure. This will cause the flattened tubular film to become partially inflated in the area between the first and second pairs of pinch rollers 14, 14a, and 16, 16a, respectively. While the tubular film 10 is thus partially inflated, the dusting apparatus 40 can be positioned and firmly seated within the bubble 20 of the film as is described in greater detail hereinbelow. After the dusting apparatus 40 has been positioned and firmly seated in the bubble 20 of the tubular film, the tubular film 10 is advanced and threaded between the second pair of pinch rollers 16 and 16a, thence onto the inventory roller 18. Prior to threading that portion of the tubular film 10 containing the aforementioned aperture through the pinch rollers 16 and 16a, additional air under low pressure can be introduced therein until the desired bubble configuration is attained.

In the practice of the present invention, the diameter of the bubble formed in the tubular film will usually be the same as the diameter of the tubular films commercially produced and presently used. Care should be exercised in forming the bubble, however, in order to assure that the wall of the tubular film is not subjected to excess stress and the normal diameter of the tubular film is not distorted.

The dusting device 40 is positioned and firmly seated within the bubble 20 by means of rotatable rollers 42 and 42a mounted outside and adjacent the bubble 20 so that their outer surfaces each tangentially contact the outer wall of the bubble 20.

Inside the bubble 20, there is provided a rigid support means 46, such as a lightweight frame, thin-gauged plates and the like, to which is mounted a second pair of rotatable rollers 44 and 44a. These rotatable rollers 44 and 44a are preferably mounted on the support means 46 with their shafts parallel to each other so that the outer surface of each roller tangentially contacts the wall of the bubble 20 at points which are diametrically opposite each other with respect to the wall of the bubble 20 (FIGURE 3). The rotatable rollers 44 and 44a inside the bubble 20 are positioned on the support means 46 adjacent to the rollers 42 and 42a outside the bubble 20 so that the rollers 42, 42a and 44, 44a, respectively, tangentially contact and firmly engage the wall of the bubble 20 therebetween. Stated in another way, rotatable roller 44 inside the bubble 20 and rotatable roller 42 outside the bubble 20 are positioned so that the wall of the bubble 20 lies therebetween and is frictionally engaged between rollers 42 and 44. In a similar manner, the wall of the bubble 20 is frictionally engaged between rollers 42a and 44a.

The rollers 42 and 42a outside the bubble are also positioned so that they support the rollers 44 and 44a inside the bubble and thereby retain the dusting device in a substantially fixed position with respect to the bubble.

In another embodiment of the present invention, a plurality of inside and outside rollers can be provided in banked, parallel rows so that the axes of the rollers are substantially transverse to the longitudinal axis of the tubular film. The rollers can be positioned so that each inside roller on one side of the bubble rests between a pair of outside rollers through the wall of the bubble. Naturally, placement of the inside and outside rollers on the other side of the bubble would be the same. In this manner, the surface area of contact of the bubble wall between the inside and outside rollers can be greatly increased.

In still another embodiment of the present invention, a plurality of inner rollers can be provided on the support means to impart a circular configuration to the tubular film. This can be accomplished by, for example, mounting a plurality of curvilinearly shaped rollers on a circular support means whose plane is transverse to the longitudinal axis of the tubular film. Substantially the same result can also be obtained by providing curvilinearly shaped rollers separated by ball bearings.

In a more preferred embodiment of the present invention the outside rotatable rollers 42 and 42a are positioned slightly below and partially beneath the inside rotatable rollers 44, 44a, respectively, so that the bubble wall therebetween is bent slightly about the surfaces of the inside and outside rotatable rollers in addition to being frictionally engaged between each cooperating pair of rollers. In this manner, the inside rotatable rollers 44, 44a, can also be partially supported by the outside rotatable rollers 42, 42a beneath them (FIGURES 1 and 2).

The materials employed to fabricate the rollers 42, 42a and 44, 44a are not critical but internal rollers 44 and 44a should preferably be lightweight, rigid, and durable. For example, these rollers can be readily fabricated from lightweight metal construction such as stainless steel, aluminum and aluminum-containing alloys, magnesium, and magnesium-containing alloys and the like and can have crown elongated surfaces or cooperating convex and concave surfaces so that, for instance, the surface of an outside roller would nest with the surface of an inside roller in juxtaposition therewith through the bubble wall. Also suitable for this purpose are such materials as wood, rubber, synthetically produced rubber compositions, rigid and self-supporting plastics which can be molded from such synthetic organic plastics as polystyrenes, polyethylenes, polyvinyl chlorides and the like as well as various combinations thereof.

Since the internal dusting apparatus of the present invention is energized solely by the traversing movement of the tubular film, at least one of the internal rollers should be a driven roller. Hence, the friction of the internal driven roller should be sufficient to prevent slippage between this roller and the inside surface of the tubular film. This can be readily accomplished by constructing or coating the outer surface of this roller with a suitable material, such as a rubber sheet, a synthetically produced rubber-based compound and the like, to impart the necessary friction thereto.

As will be readily apparent to those skilled in the art, the support means 46 can also be fabricated from the same or similar materials that are used to fabricate the rollers.

Mounted on the same shaft with inside roller 44a is a gear 48 which is positioned to mesh with a second gear 50. The second gear 50 is mounted on the same horizontal shaft 52 that supports a pair of miter gears 54. The horizontal shaft 52 is mounted, in turn, to the support means 46 between rollers 44, 44a and the miter gears 54 are mounted intermediate the ends of the horizontal shaft 52.

The miter gears 54 and gears 48 and 50 comprise the gear means of the dusting apparatus of the present invention. As will be described in greater detail hereinbelow, these gears are interconnected to each other and inter-related with rollers 44a and 42a so that the movement of the tubular film 10 in a linear direction, either upwardly or downwardly, is transmitted therethrough and transferred to a metering screw 58 so that the metering screw 58 is caused to rotate about its vertical axis. In lieu of employing miter gears, other gear means such as bevel gears, worm gears, and the like, can be similarly employed and the same results obtained. Obviously, the gear 48 can alternatively be mounted on the same shaft with roller 44.

It should be understood, therefore, that the term "gear means" as employed throughout this application and in the appended claims is intended to include any gear means, in addition to those described immediately above, which are capable of converting the linear movement of the tubular film 10 to rotational movement of the metering screw 58 about its vertical axis.

A vertically disposed shaft 56 is connected at one end to the miter gears 54 and at the other end to a metering screw 58 by means of a suitable adapter (not shown). The metering screw 58 is contained in and passes through the body of a reservoir 60 in which is placed the powder used for dusting the inside wall of the tubular film 10. The reservoir 60 is suspended from the lower end of the support means 46 and has an aperture 62 formed in its bottom wall through which the lower end of the vertically disposed metering screw 58 is extended. The materials employed to fabricate the reservoir are also not critical but should be selected from materials which are light weight and which are also preferably transparent so that the inventory of powder in the reservoir can be easily determined. Suitable for this purpose are plastics such as those obtained from synthetic organic resins and including polyethylenes, polyolefins, polyvinyl chlorides, acrylics, acetates and the like as well as combinations thereof. The bottom wall of the reservoir can be provided from such rigid, self-supporting materials as wood, stainless steel, aluminum, rubber and synthetically produced rubber compositions and the like as well as the various synthetic organic plastic materials discussed hereinabove.

The metering screw 58 comprises a vertically disposed shaft whose circumference has a continuous, helically wound groove formed therein extending along its entire length. Since the metering screw 58 is caused to rotate about its vertical axis, it functions in a manner similar to a screw-type conveyor. The dusting powder in the reservoir 60 is carried by the helical grooves in the metering screw 58 through the body of the reservoir 60 and out of the reservoir through the aperture 62 in the bottom wall thereof. Hence, the aperture 62 formed in the bottom wall of the reservoir 60 need only have a diameter slightly larger than or equivalent to the diameter of the metering screw 58.

Suitable for use as the metering screw 58 are mechanical implements such as drill bits, machine screws and the like. Metering screws can also be readily fabricated from such materials as wood, synthetically produced and moldable organic plastics, rubber compounds, and the like. Hence, the materials employed to fabricate the metering screw 58 are not critical and metering screws having a variety of helical grooves formed therein can be readily produced by means well known to those skilled in the art.

Attached to the lower extremity of the metering screw 58 is a dispersion means 64. The shape or form of the dispersion means 64 is not critical but should be capable of circumferentially and radially dispersing the dusting powder as the metering screw 58 deposits the dusting powder on its surface. Hence, dispersion means can be provided from items such as thin, flat, solid discs, perforated discs, saucer-shaped discs, vaned discs, flatly disposed or tilted blades and the like and can be equipped with flanged or straight edges. In a preferred embodiment of the present invention, a thin, flat, perforated disc with flange edges and having a thickness of between about $\frac{1}{32}''$ to $\frac{1}{8}''$ is employed as the dispersion means.

The dispersion means 64 is attached to the metering screw 58 such that the planar surface of the dispersion means 64 is substantially perpendicular to the longitudinal axis of the vertically disposed metering screw 58. Although not critical, the dispersion means 64 should not be positioned so close to the bottom wall of the reservoir 60 as to interfere with the dispersion of the powder onto the wall of the bubble 20. Generally, a distance of between about ⅛ inch to 4 inches, as measured from the bottom wall of the reservoir 60 to the planar surface of the dispersion means 64, is suitable for this purpose. Distances greater than about 4 inches from the bottom wall of the reservoir 60 are not considered to be detrimental to the operability of the dusting apparatus but the dispersion means 64 should not be positioned so far from the bottom wall of the reservoir as to make the entire apparatus unwieldy or inoperative.

Optionally, the internal dusting apparatus of the present invention can also be equipped with centering rings which act to retain the internal dusting apparatus in a centered position with respect to the bubble wall of the tubular film being dusted. For example, one or more centering rings can be positioned above the support means 46 and/or adjacent to and completely surrounding the circumference of the reservoir. The centering rings can be selected from the same or similar materials as are employed to fabricate the bottom floor of the reservoir or the dispersion disc, as has been discussed in greater detail hereinabove. The centering rings can be supported by and connected to the support means by means well known to those skilled in the art. While the use of centering rings is optional, it has been found that such means are helpful in maintaining the internal dusting apparatus centered in the bubble wall, particularly when the tubular film is travelling in a downward vertical direction.

In another embodiment of the present invention, an internal agitating device 68, as shown in FIGURE 2, can be mounted on the metering screw 58 intermediate its ends and within the body of the reservoir 60. This agitating device 68 can comprise a plurality of fan blades whose surfaces are tilted so that the powder in the reservoir is stirred, agitated and propelled when the fan blades rotate. Being attached to the metering screw 58, the agitating device 68 will rotate at the same rate as the metering screw 58 and stop and start when the metering screw starts and stops. Obviously, the outside diameter of the agitating device should be less than the inside diameter of the reservoir so that no danger of rupturing the reservoir wall is present. The agitating device 68 is particularly helpful when dusting powders having poor flow properties are employed or when atmospheric conditions, such as high humidity, interfere with the flow properties of the dusting powder being used.

In operation, the dusting apparatus of the present invention functions completely free from any outside sources of power since it is energized entirely by and through the linear movement of the tubular film. After the flattened web of tubular film 10 has been properly threaded through lower pinch rollers 14 and **14*a* from the supply roll 12, then through upper pinch rollers 16 and 16*a* to the take-up roll 18, the internal dusting apparatus 40 of the present invention is positioned and firmly seated within the bubble 20** of the tubular film, as has been described hereinabove.

The tubular film 10 is then linearly disposed in an upward vertical direction, usually by a drive means connected to the take-up roll 18. As the wall of the bubble 20 is disposed with respect to the dusting apparatus 40, it is frictionally engaged between outside rollers 42 and **42*a* and the respectively cooperating inside rollers 44 and 44*a*, and these rollers are thusly caused to rotate. The rotation of inside roller 44*a*, acting through the gear means, comprising gears 48, 50 and the miter gears 54, causes the vertical shaft 56 together with the metering screw 58 to rotate about their longitudinal axes. Since the dispersion means 64 is attached to the metering screw 58, this is also caused to rotate at the same rate as the vertical shaft 56 and the metering screw 58. In this manner, the dusting powder is carried by the metering screw 58, acting in a manner similar to a screw conveyor, from the body of the reservoir 60 through the aperture 62 and is deposited on the rotating dispersion means 64. As the dusting powder contacts the rotating dispersion means 64, centrifugal force is imparted to the particles and they are thusly circumferentially and radially thrust therefrom. As a result, a dust cloud is formed within the bubble 20 and the dusting powder is caused to contact and adhere to the walls of the bubble 20. When the linear movement of the tubular film 10** is stopped, this automatically stops the dusting process too since the dusting apparatus has lost it source of energization.

While the operation of the internal dusting apparatus 40 has been described in relation to the vertical upward movement of the tubular film 10, it should be understood that the same results can be obtained when the tubular film 10 is caused to move in a downward vertical direction, the internal dusting apparatus 40 functioning in the same manner just described.

The dusting apparatus of the present invention can be readily employed to accommodate tubular films of varying diameters. For example, an internal dusting apparatus of the present invention can be constructed to fit within a tubular film having a diameter of about 1.5 inches but will also readily accommodate tubular films having diameters up to about 3.5 to 4.0 inches. In similar fashion, an internal dusting apparatus of the present invention can be constructed to fit within a tubular film having a diameter of about 4.5 inches and can also be readily employed to accommodate tubular films having diameters up to about 7.5 to 8.5 inches.

The internal dusting apparatus of the present invention can also be constructed so that it is capable of accommodating a large range of diameters in tubular films. For example, this can be accomplished by providing a dusting apparatus wherein the support means are provided with self-adjusting means such as springs, hydraulic cylinders and the like, which permit the support means to move in a direction transverse to the longitudinal axis of the tubular film and allow the inside rollers to adjust to varying diameters. In this manner, the inside rollers can maintain their frictional engagement with the wall of the tubular film while other means are provided to retain the gear means in mesh with each other and simultaneously keep the metering screw centered in the reservoir.

The outside rollers can be similarly equipped with adjusting means such as springs, hydraulic cylinders and the like, so that they can be adjusted to maintain frictional engagement with the outside wall of the tubular film and retain their relative positions with respect to the inside rollers.

The various means which can be employed to construct the internal dusting apparatus so that it is self-adjusting are well within the knowledge of those skilled in the art.

The operability and efficiency of the internal dusting apparatus of the present invention can be further demonstrated by the following examples which are merely illustrative and are not intended to be, in any way, limitative thereof.

EXAMPLE 1

The dusting apparatus illustrated in FIGURE 1 was assembled to determine the amount of dusting powder the metering screw was capable of delivering under varying conditions. However, instead of forming a bubble in a web of tubular film and inserting the dusting apparatus therein to be driven by the linear movement of the tubular film, the apparatus employed consisted of all the component parts shown in FIGURE 1 except that no dispersion means 64 was attached to the metering screw 58. In lieu of being energized by a tubular film, the apparatus was driven by means of a sprocket and chain, one end of the chain being trained about outside roller **44*a* while the other end was trained about a sprocket which, in turn, was connected to a drive motor. Under this arrangement, the rate at which the metering screw rotated could be varied by employing different sprocket tooth ratios. A polyethylene bag was fitted about the lower end of the reservoir 60 of the dusting apparatus so that it completely surrounded and contained that portion of the metering screw 58** extending downwardly from the bottom wall of the reservoir and the lower portion of the reservoir. The diameter of the metering screw, the diameter of the apertures in the bottom wall of the reservoir through which the metering screw was extended and the rates of rotation of the metering screw were varied to study their affect on the amount of dusting powder delivered by the metering screw into the polyethylene bag.

Straight shank twist drills were employed as metering screws while the dusting powder used consisted of a powdered mixture comprising 100% by weight potato starch and corn starch together with 0.1% by weight powdered silicon dioxide which was added to the corn starch-potato starch powder mixture to improve its flow properties. Maple wood rollers having a diameter of 1.5 inches were used for rollers 42 and **42*a* while rubber rollers having a diameter of 0.870 inch were used for rollers 44 and 44*a*. The gears 48 and 50 were stainless steel gears having 48 and 72 teeth, respectively, and inter-connected to each other and to the miter gears 54 which had a ratio of 1:1. The shaft 56 which linked the miter gears 50 to the metering screw 58 consisted of steel and had a diameter of ⅛ inch while the reservoir 60** was fabricated from cast acrylic resin and had an inside diameter of 1¼ inches and was 4¼ inches long. The bottom wall of the reservoir consisted of Monel metal having a thickness of ¼ inch.

The amount of dusting powder delivered by the metering screw to the polyethylene bag was determined at one minute intervals for a period of seven consecutive minutes before the reservoir was refilled. The polyethylene bag was weighed at the end of each minute and at the end of the seven minute run so that the cumulative amount as well as the individual amounts of dusting powder delivered during the seven minutes was obtained. The average rate at which the dusting powder was delivered to the polyethylene bag; that is, the powder feed rate, was calculated from the least square of the incremental amounts of dusting powder deposited after each minute.

Nine runs were made under varying conditions for metering screw diameter, aperture diameter and rate of rotation of the metering screw. The results obtained from these runs are set forth in Table I below:

its flowability, while the dusting powder used for dusting film B consisted of a flowable mixture of corn starch

TABLE I

|  | Run No. | | | | | | | | |
|---|---|---|---|---|---|---|---|---|---|
|  | 1 | 2 | 3 | 4 | 5 | 6 | 7 | 8 | 9 |
| Diameter of metering screw (inches) | 3/32 | 3/32 | 3/32 | 3/32 | 3/32 | 3/32 | 5/32 | 5/32 | 5/32 |
| Diameter of aperture (inches) | 3/32 | 3/32 | 3/32 | 1/8 | 1/8 | 1/8 | 5/32 | 5/32 | 5/32 |
| Rate of rotation of metering screw (r.p.m.) | 660 | 1,350 | 2,010 | 660 | 1,350 | 2,010 | 660 | 1,350 | 2,010 |
| Cumulative powder obtained in grams: | | | | | | | | | |
| After 1 minute | 5.4 | 3.7 | 7.3 | 3.8 | 5.1 | 6.9 | 8.1 | 14.8 | 17.4 |
| After 2 minutes | 7.8 | 7.2 | 12.2 | 7.3 | 10.2 | 13.5 | 16.0 | 28.1 | 35.0 |
| After 3 minutes | 10.2 | 10.5 | 17.2 | 10.7 | 15.2 | 20.2 | 23.3 | 42.1 | 53.5 |
| After 4 minutes | 12.6 | 13.7 | 22.0 | 14.1 | 20.3 | 26.8 | 31.4 | 56.2 | 72.2 |
| After 5 minutes | 15.1 | 16.9 | 26.9 | 17.6 | 25.2 | 33.7 | 38.7 | 69.9 | 91.0 |
| After 6 minutes | 17.4 | 20.1 | 31.7 | 21.2 | 30.4 | 41.1 | 46.7 | 84.4 | 110.5 |
| After 7 minutes | 19.7 | 23.2 | 36.5 | 24.7 | 35.6 | 47.7 | 55.9 | 99.3 | 130.5 |
| Powder feed rate (grams/min.) | 2.4 | 3.2 | 4.9 | 3.5 | 5.1 | 6.8 | 7.9 | 14.1 | 18.9 |

As can be seen from the results set forth in Table I, the amount of powder delivered per minute is surprisingly uniform and the powder feed rate increases when either the diameter of the metering screw or the diameter of the aperture or both are increased. The powder feed rate is further increased in all instances when the rate of rotation of the metering screw is increased. Hence, by increasing the diameters of both the metering screw and the aperture as well as the rate of rotation of the metering screw, increased powder feed rates can be readily obtained and the amount of powder deposited on the film wall can be very accurately controlled.

EXAMPLE 2

In order to determine the uniformity of dispersion of the dusting powder on the inside wall of a web of tubular thermoplastic film, the dusting apparatus described in Example 1 hereinabove was placed in the bubble formed in two separate, plasticized polyvinyl chloride tubular films each having different diameters. The dusting apparatus was positioned and seated in the bubble formed in each of the two webs of tubular film in the same manner as described hereinabove and as depicted in FIGURE 1. Hence, no separate drive means was employed as described in Example 1, the dusting apparatus being energized solely by the linear movement of the film. Added to the apparatus, however, was a dispersion means which consisted of a thin, flat, perforated, stainless steel disc having a diameter of 1 15/32 inches and a flange 1/4 inch high about the edge of its circumference. The disc was attached to the lower end of the metering screw so that its planar surface was about 1.0 inch from the bottom wall of the reservoir.

One film, A, had a diameter of 2.1 inches and was dusted while travelling in a downward vertical direction. The other film, B, had a diameter of 3.2 inches and was dusted while travelling in an upward vertical direction. The dusting powder used for dusting film A consisted of a mixture of corn starch and potate starch to which was added 0.1% by weight silicon dioxide to enhance and potato starch different from that employed for film A thereby eliminating the need to add silicon dioxide.

During dusting, the linear speed of the tubular films was varied in order to vary the rates of rotation of the metering screw and the dispersion disc. Additionally, the diameter of the metering screws employed and the diameter of the aperture in the bottom wall of the reservoir were also varied in each instance.

After each web of tubular film had been thusly dusted, a film sample was taken from three different locations in each reel of film collected; that is, the top, middle and bottom of each film reel, the bottom corresponding to that portion of the web of tubular film first dusted. The amount of dusting powder deposited on each sample obtained was determined by cutting the film into five pieces, each 12 inches in length, and weighing the individual strips of film. Each strip of film was then wiped free of dusting powder and re-weighed. The difference in weight represents the amount of dusting powder that was deposited on the film strip. The weight of the dusting powder deposited was also calculated per unit surface area of the film by measuring the flat width of each film strip.

The results obtained were measured against two control webs of the same tubular films employed above, A and B. All the conditions and measuring techniques were the same as set forth hereinabove except that the control films were dusted by employing the conventional shaken porous bag technique and the film travelled only in an upward vertical direction. The dusting powder used to dust the control films in each instance consisted of a mixture of corn starch and potato starch.

The results of these determinations are tabulated in Table II below wherein the values listed in the column identified as "percentage" are arbitrary numbers obtained by dividing the maximum variation in the amount of powder located from the top to bottom of a reel by the average amount of powder located at the three reel positions.

TABLE II

| Film | Film Diameter (inches) | Film Direction | Film Speed (f.p.m.) | Rate of Rotation of Metering Screw (r.p.m.) | Diameter of Metering Screw (inches) | Diameter of Aperture (inches) | Size of Film Reel (ft.) | Weight of Powder on Film Samples (grams/10M in.²) | | | Maximum Variation in Amount of Powder Deposited at the Three Positions in Each Film Reel | |
|---|---|---|---|---|---|---|---|---|---|---|---|---|
|  |  |  |  |  |  |  |  | Top | Middle | Bottom | Grams/ 10M in.² | Percentage |
| A | 2.1 | Up | 520 |  |  |  | 1,600 | 0.1 |  | 0.2 | 0.1 | 67 |
| Control (Porous Bag Technique) | 2.1 | Up | 520 |  |  |  | 3,250 | 0.2 | 0.1 | 0.5 | 0.5 | 148 |
| B | 3.2 | Up | 520 |  |  |  | 3,550 | 0.5 | 1.6 | 2.4 | 1.9 | 127 |
| Control (Porous Bag Technique) | 3.2 | Up | 520 |  |  |  | 3,400 | 0.8 | 1.5 | 0.8 | 0.7 | 70 |
|  | 3.2 | Up | 520 |  |  |  | 3,450 | 0.6 | 1.1 | 1.5 | 0.9 | 82 |
| A (Internal Dusting Apparatus) | 2.1 | Down | 340 | 1,000 | 3/32 | 1/8 | 3,450 | 1.7 | 1.6 | 1.6 | 0.1 | 6 |
|  | 2.1 | do | 465 | 1,350 | 3/32 | 1/8 | 3,350 | 1.3 | 1.3 | 1.5 | 0.2 | 14 |
|  | 2.1 | do | 575 | 1,650 | 3/32 | 1/8 | 3,050 | 1.4 | 1.7 | 1.3 | 0.4 | 27 |
| B (Internal Dusting Apparatus) | 3.2 | Up | 610 | 1,750 | 1/8 | 9/64 | 3,400 | 1.5 | 1.3 | 1.3 | 0.2 | 14 |
|  | 3.2 | Up | 610 | 1,750 | 1/8 | 9/64 | 3,350 | 1.6 | 1.5 | 1.6 | 0.1 | 6 |
|  | 3.2 | Up | 610 | 1,750 | 1/8 | 9/64 | 3,350 | 1.7 | 1.4 | 1.6 | 0.3 | 19 |

The results set forth in Table II above clearly show that by employing the dusting apparatus of the present invention, more dusting powder can be deposited on the film wall and can be deposited thereon more uniformly than when conventional dusting techniques are employed, regardless of the rate of speed at which the web of tubular film is travelling.

EXAMPLE 3

Of primary importance is the evaluation of the blocking characteristics that the dusted films exhibit. In order to determine blocking characteristics of the film samples dusted in accordance with Example 2 above, ten film samples each 12 inches in length were cut from approximately the same reel locations; that is, top, middle and bottom. Each of the film samples was then subjected to a weight compression of 24 pounds and placed in an oven maintained at a temperature of 120° F. for a period of about 24 hours. At the end of this time, the blocking characteristics of each of the samples was determined by measuring the time it took to open each sample.

Each film sample was first manually opened and then slipped onto and positioned about the fingers of a commercially available apparatus generally employed to spread open tubular films prior to stuffing and inserting food products therein, such as the apparatus described and set forth in U.S. Patent 2,884,328. The fingers are then caused to move apart from each other and, in this manner, the tubular film can be stretched.

The time required to open and position tubular films on such apparatus provides an indication of the efficacy of the dusting process. Generally, when films have been properly dusted, they can be manually opened and positioned on such apparatus in between about 3 to 9 seconds.

The results tabulated in Table III above clearly indicate tests are set forth in Table III below.

TABLE III

| Film | Film Diameter (in.) | Elapsed Time to Open and Position Samples (Seconds) | | |
|---|---|---|---|---|
| | | Top | Middle | Bottom |
| A | 2.1 | 60+ | | 60+ |
| Control | 2.1 | 60+ | 60+ | |
| (Porous Bag) Technique | | | | |
| B | 3.2 | 40 | 5 | 4 |
| Control | 3.2 | 8 | 5 | 6 |
| (Porous Bag Technique) | 3.2 | 9 | 5 | 6 |
| A | 2.1 | 6 | 7 | 9 |
| (Internal Dusting Apparatus) | 2.1 | 7 | 8 | 7 |
| | 2.1 | 7 | 6 | 9 |
| B | 3.2 | 4 | 4 | 5 |
| (Internal Dusting Apparatus) | 3.2 | 5 | 5 | 5 |
| | 3.2 | 5 | 5 | 5 |

The results tabulated in Table III above clearly indicate that the dusting apparatus of the present invention functions equally as well as and, in most instances, is significantly superior to presently available commercial dusting equipment and techniques employed in eliminating the blocking characteristics inherent in tubular plastic films. Furthermore, the consistency with which the dusting powder is uniformly deposited per unit of passing tubular film by means of the present internal dusting apparatus is amply manifested.

While the present invention has been described and discussed in some detail and with particularity, it should be understood that changes, modifications and variations can be made therein, in addition to those suggested herein, without departing from the scope and spirit of the invention.

What is claimed is:

1. An apparatus for dusting the inside wall of tubular plastic film with a powdered, anti-blocking agent comprising, in combination,
    (a) a support means positioned within a bubble in a web of tubular, plastic film;
    (b) a rotatable means mounted on said support means inside the wall of said bubble cooperating with rotatable means positioned outside the wall of said bubble, said inside and outside rotatable means frictionally engaging the wall of said bubble therebetween and said outside rotatable means supporting said inside rotatable means within said bubble wall;
    (c) a reservoir suspended from said support means which contains a powdered anti-blocking agent;
    (d) means for moving said web of tubular film in a vertically linear direction such that said inside rotatable means and outside rotatable means are caused to rotate solely as a result of their frictional engagement with the bubble wall therebetween; and
    (e) gear means and metering means within said bubble wall cooperating with said inside rotatable means and said reservoir such that the powdered anti-blocking agent is dispersed upon the inside wall of said bubble solely as a result of the vertically linear movement of the web of tubular film.

2. An apparatus for dusting the inside wall of tubular plastic film with a powdered, anti-blocking agent comprising, in combination,
    (a) a support means positioned within a bubble in a web of tubular, plastic film;
    (b) rotatable means mounted on said support means inside the wall of said bubble cooperating with rotatable means positioned outside the wall of said bubble, said inside and outside rotatable means frictionally engaging the wall of said bubble therebetween and said outside rotatable means supporting said inside rotatable means within said bubble wall;
    (c) a reservior suspended from said support means which contains a powdered, anti-blocking agent;
    (d) a metering means vertically disposed within said reservoir and extending beyond the lower end of said reservoir;
    (e) a disc-shaped dispersion means connected to the lower end of said metering means;
    (f) means for moving said web of tubular film in a vertically linear direction such that said inside rotatable means and outside rotatable means are caused to rotate solely as a result of their frictional engagement with the bubble wall therebetween; and
    (g) means for transforming rotation of said inside rotatable means to rotation of said metering means about its vertical axis.

3. The apparatus of claim 2 wherein the means which transforms the rotation of said inside rotatable means to rotation of said metering means about its vertical axis comprises a gear means mounted on said support means and interconnected at one end to said inside rotatable means and connected at the other end to said metering means.

4. An apparatus for dusting the inside wall of tubular plastic film with a powdered, anti-blocking agent comprising, in combination;
    (a) a support means positioned within a bubble in a web of tubular plastic film;
    (b) a first pair of rotatable rollers mounted on said support means such that each of said first pair of rotatable rollers tangentially contacts the inside wall of said bubble;
    (c) a second pair of rotatable rollers mounted adjacent to and tangentially contacting the outside wall of said bubble such that the wall of said bubble is frictionally engaged between said first and second pairs of rotatable rollers and said first pair of rotatable rollers is supported by said second pair of rotatable rollers through the wall of said bubble;
    (d) a gear means mounted on said support means and connected to said first pair of rotatable rollers;
    (e) a reservoir vertically suspended from said support means having an aperture defined in its bottom wall, said reservoir containing a powdered, anti-blocking agent;

(f) a vertically disposed shaft connected at one end to said gear means and extending therefrom into the body of said reservoir;

(g) a metering screw connected at one end to the lower end of said vertically disposed shaft and suspended vertically therefrom within the body of said reservoir such that it extends through and beyond the aperture defined in the bottom wall of said reservoir; and (h) a disc-shaped dispersion means connected to the lower end of said vertically suspended metering screw.

5. The apparatus of claim 4 wherein the metering screw comprises a rigid shaft having helically wound grooves about its circumference which extend along its entire length.

6. The apparatus of claim 4 wherein the dispersion means comprises a flat, thin gauged disc whose planar surface is horizontally disposed with respect to the vertical axis of said metering screw and which is positioned between about ⅛ to 4 inches below the bottom wall of said reservoir.

7. The apparatus of claim 4 wherein an agitating device is attached to said metering screw intermediate its ends within the body of said reservoir, said agitating device being capable of stirring, agitating and propelling the powdered anti-blocking agent in the reservoir.

8. An apparatus for dusting the inside wall of tubular plastic film with a powdered, anti-blocking agent comprising, in combination;

(a) a rigid, light weight support means positioned within a bubble in a web of tubular plastic film;

(b) a first pair of rotatable rollers mounted on said support means such that each of said first pair of rotatable rollers are parallel to each other and tangentially contact the inside wall of said bubble;

(c) a second pair of rotatable rollers mounted adjacent to the outside wall of said bubble and positioned to tangentially contact the wall of said bubble such that the bubble wall is frictionally engaged between said first and second pairs of rotatable rollers and said first pair of rotatable rollers is supported by said second pair of rotatable rollers and wherein linear movement of the web of tubular film results in rotation of said first and second pairs of rollers;

(d) a gear means mounted on said support means interconnected at one end to at least one of said inside pair of rotatable rollers and connected at the other end to a vertically disposed shaft;

(e) a reservoir vertically suspended from said support means having an aperture defined in its bottom wall, said reservoir containing a powdered anti-blocking agent;

(f) a metering screw comprising a rigid shaft having helically wound grooves about its circumference which extend along its entire length, said metering screw being connected at one end to the lower end of said vertically disposed shaft and extending vertically therefrom within the body of said reservoir through and beyond the aperture defined in the bottom wall of said reservoir; and (g) a flat, thin-gauged dispersion disc mounted to the lower end of said metering screw at a distance of between ⅛ to 4 inches from the bottom wall of said reservoir and whose planar surface is horizontally disposed with respect to the vertical axis of said metering screw.

9. The apparatus of claim 8 wherein the diameter of the metering screw is the same as the diameter of the aperture defined in the bottom wall of said reservoir.

References Cited
UNITED STATES PATENTS

| | | | |
|---|---|---|---|
| 3,065,097 | 11/1962 | Zupic | 117—18 |
| 3,153,599 | 10/1964 | Klein et al. | 117—18 |
| 3,172,930 | 3/1965 | Johnson et al. | 117—18 X |

WILLIAM D. MARTIN, Primary Examiner

PAUL ATTAGUILE, Assistant Examiner

U.S. Cl. X.R.

117—18; 264—130; 18—14; 118—308